United States Patent [19]

De Busscher

[11] Patent Number: 4,461,306

[45] Date of Patent: Jul. 24, 1984

[54] COMBINE HARVESTERS

[75] Inventor: Cyriel R. J. De Busscher, Sijsele-Damme, Belgium

[73] Assignee: Sperry Corporation, New Holland, Pa.

[21] Appl. No.: 502,863

[22] Filed: Jun. 9, 1983

[30] Foreign Application Priority Data

Jun. 19, 1982 [GB] United Kingdom ............... 8217821

[51] Int. Cl.³ ..................... A01F 12/00; A01F 7/04
[52] U.S. Cl. ................... 130/27 R; 130/27 J; 130/27 P; 130/27 T
[58] Field of Search ............ 130/27 R, 27 H, 27 J, 130/27 P, 27 Q, 27 T; 56/14.6

[56] References Cited

U.S. PATENT DOCUMENTS

| 1,770,792 | 7/1930 | Lizamore. | |
|---|---|---|---|
| 2,633,851 | 4/1953 | Boyer | 130/27 R |
| 3,124,139 | 3/1964 | Stokland | 130/27 H |
| 3,662,763 | 5/1972 | Denison et al. | 130/27 P |
| 3,871,384 | 3/1975 | Depauw et al. | 130/27 T |
| 4,078,571 | 3/1978 | Todd et al. | 130/27 T |
| 4,108,150 | 8/1978 | Shavier | 130/27 H |
| 4,154,250 | 5/1979 | Stuber | 130/27 H |

FOREIGN PATENT DOCUMENTS

| 7902561 | 2/1979 | Brazil. |
| 1938082 | 12/1978 | Fed. Rep. of Germany. |
| 2430718 | 12/1979 | Fed. Rep. of Germany. |
| 2936339 | 3/1980 | Fed. Rep. of Germany. |
| 1209280 | 10/1970 | United Kingdom. |
| 598587 | 12/1973 | U.S.S.R. |

Primary Examiner—Paul J. Hirsch
Attorney, Agent, or Firm—Darrell F. Marquette; Frank A. Seemar; Larry W. Miller

[57] ABSTRACT

A combine harvester is disclosed in which the threshing and separating means includes a rotor, a concave extending at least partially around the rotor at a location above the axis of rotation of the rotor, and sweepers disposed in the vicinity of the concave and operable to sweep crop material passing through the concave means away from the latter so as to prevent any excessive build up of crop material on the concave.

18 Claims, 4 Drawing Figures

COMBINE HARVESTERS

BACKGROUND OF THE INVENTION

This invention relates to combine harvesters and has particular reference to such machines having a threshing and/or separating mechanism comprising a rotor and concave means which extend at least partially around the rotor at a location above the axis of rotation of the latter.

In combine harveters of the type indicated a problem can arise with regard to the adequate removal of grain separated through the concave at locations above the axis of rotation of the rotor inasmuch as there is a tendency for separated grain to build up on the concave and thus impair the further operation thereof. This is particularly so in machines having a concave which extends essentially totally around the rotor, the problem of excessive grain build up, being paramount at the upper portion of such a concave.

In U.S. Pat. No. 4,108,150 there is disclosed a combine harvester of the axial flow type in which a threshing rotor is surrounded by a concave and a plurality of fingers are disposed close to the concave on the side remote from the rotor and spaced axially of the rotor. The fingers are mechanically vibrated so as to agitate grain and any other crop material passing through the concave so that air flowing through the concave as a result of rotor rotation can dislodge this material to make it fall to a mechanism for distributing that material to other components of the machine. It is found, however, that mere agitation of the grain, etc. is insufficient to ensure the necessary movement thereof from the concave, particularly from the upper portion of the latter.

SUMMARY OF THE INVENTION

According to the present invention a combine harvester is provided having threshing and/or separating means comprising a rotor, concave means extending at least partially around the rotor at a location above the axis of rotation of the rotor, and means disposed in the vicinity of the concave means and operable to sweep crop material passing through the concave means away from the latter so as to prevent any excessive build up of crop material on the concave means.

The concave means may extend totally around the rotor, and the sweeper means may be associated with an upper portion of the concave means. The sweeper means may extend over an arc of approximately 115° centered on the vertical plane containing the rotor axis and may comprise a plurality of rotary sweepers comprising shafts to which are attached blades arranged to pass close to the concave means to sweep crop material therefrom. Preferably, each sweeper shaft is fitted with a pair of radially extending, diametrically opposed blades, and the sweeper means are arranged so that the paths of adjacent sweepers overlap, the blades of one sweeper being 90° out of phase with the adjacent sweeper to prevent physical interference therebetween.

One or more sweeper means may be arranged to sweep crop material in one direction away from the concave means, and one or more other sweeper means may be arranged to sweep crop material in another direction away from the concave means, with said one direction and said other direction preferably being to either side, respectively, of the rotor, whereby the shafts of the sweeper means extend parallel to the rotor axis.

The rotor may extend transversely of the machine with the concave means having an input aperture for crop material and at least one discharge aperture for crop material, and the forwardmost and rearwardmost sweeper means each having means operable to sweep crop material over the concave generally axially of the rotor before the associated blades sweep that crop material away from the concave means, whereby crop material is prevented from being swept onto either the incoming crop material and/or the discharged crop material.

In a preferred embodiment, the invention is applied to separating means of the axial flow type to which crop material is fed from threshing means, with means being provided for splitting the incoming crop material into two portions which are fed spirally around the rotor towards respective ends thereof, two discharge apertures being provided with two sets of blades serving to sweep respective portions of the crop material to either side of the rotor centerline transverse to the rotor axis, with each of the forwardmost and rearwardmost sweeper means having said means for sweeping crop material generally axially of the rotor associated with each set of blades, said means of the forwardmost sweeper means being operable to sweep crop material towards the associated side of the machine, and said means of the rearwardmost sweeper means being operable to sweep crop material towards the center of the machine.

The rotor may be housed in a casing having input and discharge apertures corresponding to those of the concave means and having in the bottom thereof at least one conveyor to which crop material swept forwardly of the machine falls and which conveys that crop material to a grain pan of the machine. The conveyor may be in the form of an auger and may have means such as vanes provided to discharge crop material from the auger so as to spread the crop material transversely of the grain pan.

BRIEF DESCRIPTION OF THE DRAWINGS

A combine harvester embodying the present invention will now be described in greater detail, by way of example, with reference to the accompanying drawings in which.

DETAILED DESCRIPTION OF THE PREFERRED EMBODIMENT

Figure 1:
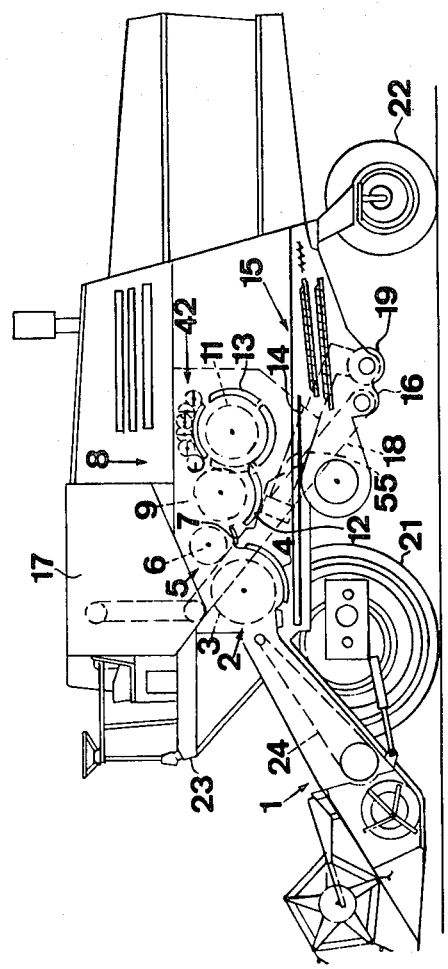
FIG. 1 is a side view of the combine harvester showing schematically some of the interior components.

The terms "grain", "straw", and "tailings" are used principally throughout this specification for convenience and it should be understood that these terms are not intended to be limiting. Thus "grain" refers to that part of the crop which is threshed and separated from the discardable part of the crop material which is referred to as "straw". Incompletely threshed ears are referred to as "tailings".

Also, the terms "forward", "rearward", "left", "right", when used in connection with the combine harvester and/or components thereof are determined with reference to the direction of forward operative travel of the combine but should not be construed as limiting.

The combine harvester is generally conventional in its basic components and comprises a header 1 pivotally mounted on the frame of the machine so as to be adjustable for cutting height, a threshing mechanism 2 comprising a threshing rotor 3 and a concave 4, a so-called straw beater 5 having a rotor 6 and a separator concave or grate 7, and a separating mechanism 8 which comprises two rotors 9,11 and associated separating concaves or grates 12,13. The machine further comprises a grain pan 14 and a grain cleaning mechanism 15, clean grain being fed from a clean grain trough 16 to a grain tank 17 via a grain elevator 18, and tailings being fed to a tailings trough 19 which embodies a tailings rethreshing mechanism (not shown), the rethreshed tailings being fed back to the grain pan 14. The machine has a pair of front, driven wheels 21 and a pair of rear, steerable wheels 22, the machine being controlled from an operator's platform 23.

In operation, the machine moves forwardly into standing crop and cuts the same, the cut crop being fed to the threshing mechanism 2 by a crop elevator 24 to which the header 1 is connected. The threshing mechanism 2 threshes the crop material and grain separated therefrom falls through the associated concave 4 to the grain pan 14. The threshed crop material is then fed to the straw beater 5 which effects further grain separation through the associated grate 7, the separated grain again falling to the grain pan 14. From the straw beater 5, the crop material is passed to the first rotor 9 of the separating mechanism 8 and thence to the second rotor 11 of that mechanism, grain being separated by both rotors and in the first case falling through the separating grate 12, again directly to the grain pan 14. Grain separated by the second separating rotor 11 is also fed to the grain pan 14 and the manner in which this is accomplished will be described in greater detail hereinafter.

The grain pan 14 is reciprocated in conventional manner so that grain falling thereon is shaken from the rear end thereof onto sieves of the cleaning mechanism 15. The clean grain falls through the cleaning sieves to the clean grain trough 16 and is then conveyed to the grain tank 17. Any tailings which are passed to the cleaning mechanism 15 are collected in the tailings trough 19, rethreshed and then passed back to the grain pan 14 in a manner to be described. In this way, the rethreshed tailings pass through the cleaning mechanism 15 once more.

Figure 2:
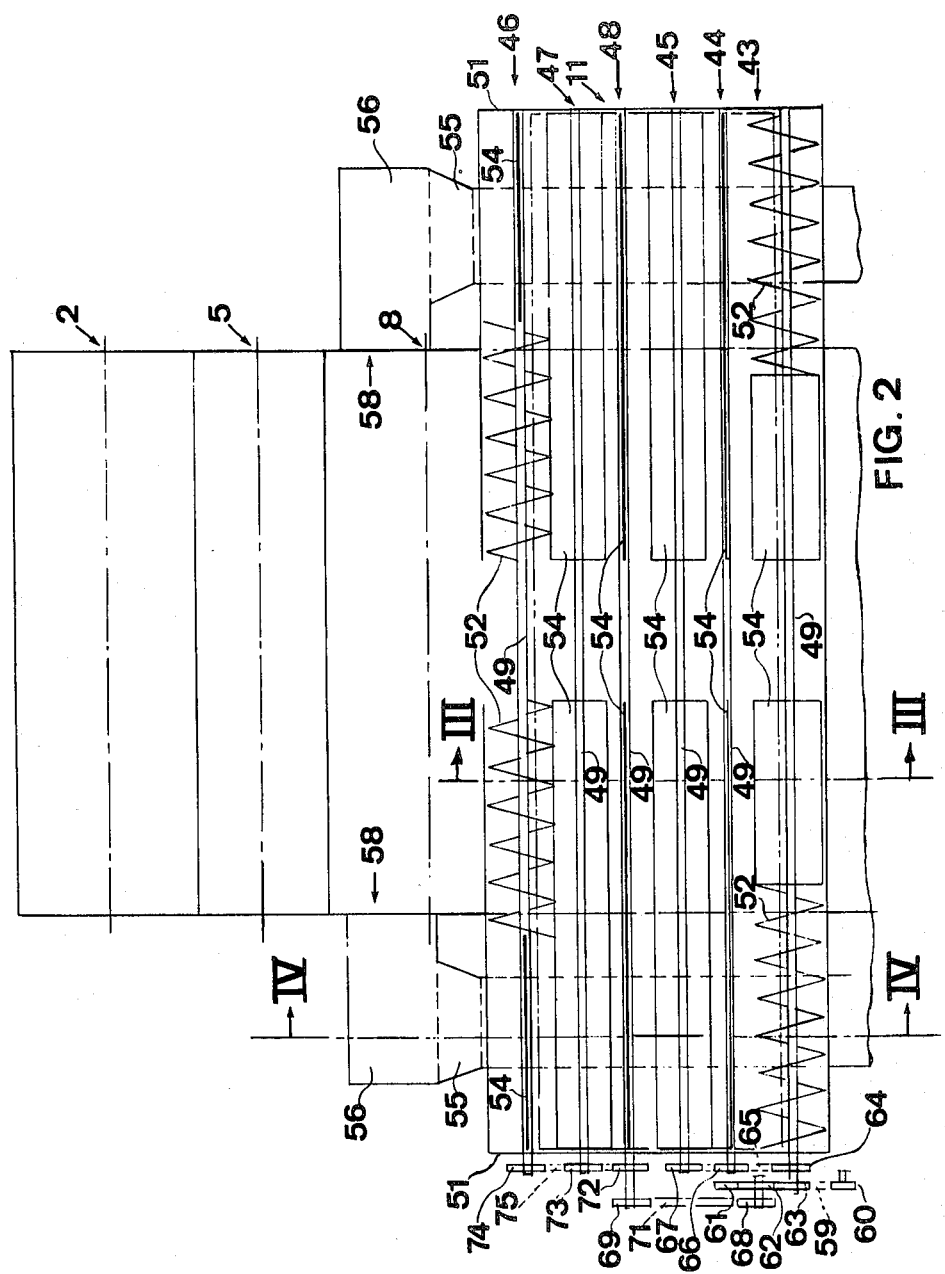
FIG. 2 is a plan view of a portion of FIG. 1 with certain components removed for clarity.
Figure 3:
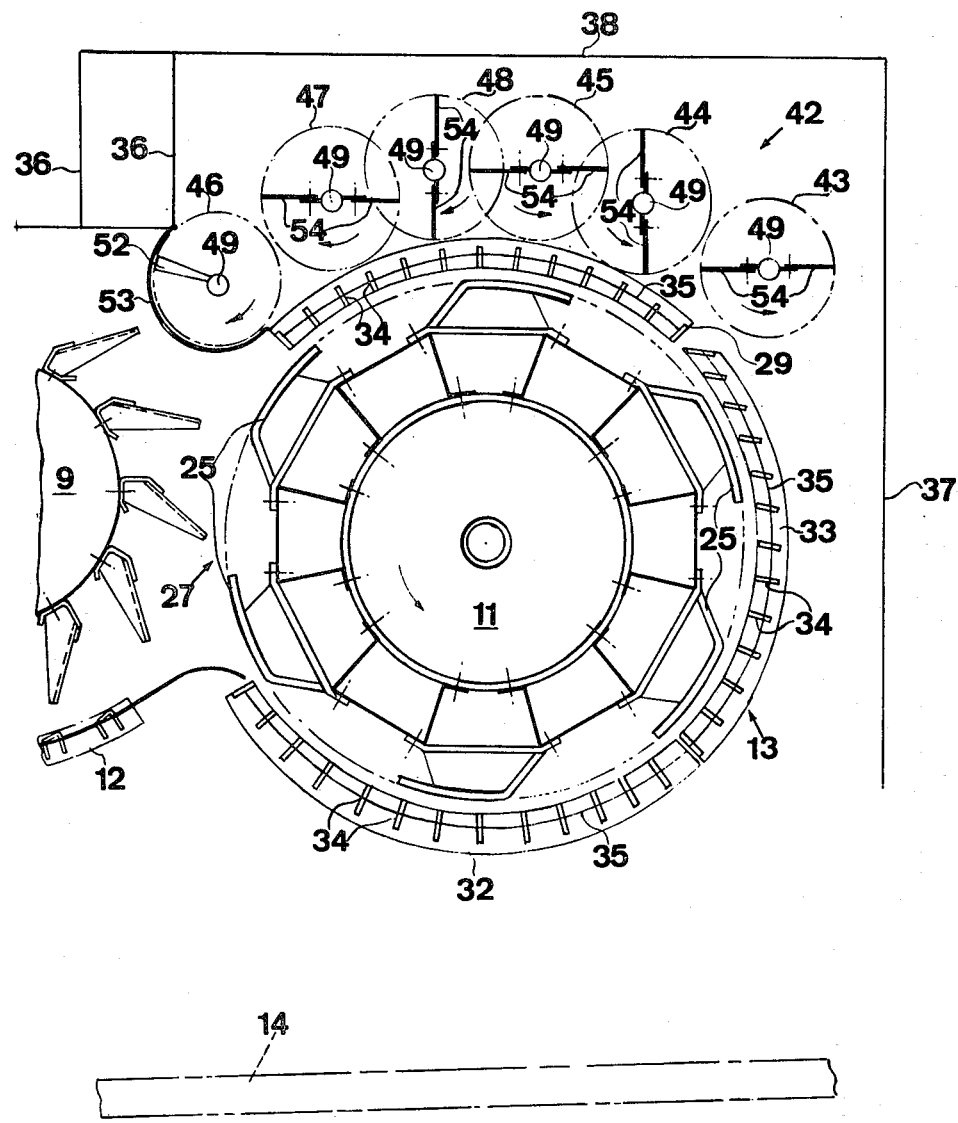
FIG. 3 is a section on the lne III—III of FIG. 2.
Figure 4:
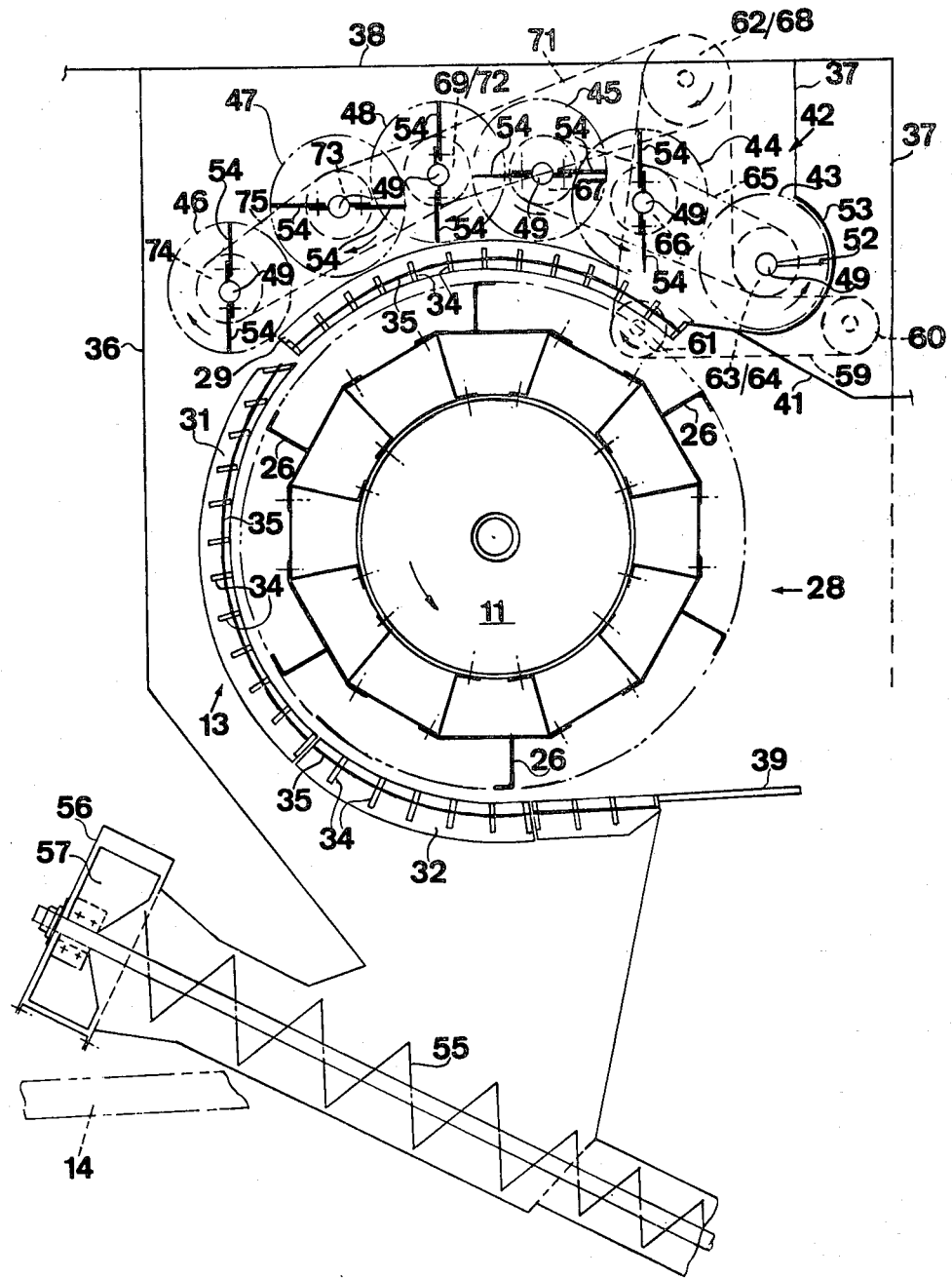
FIG. 4 is a section on the line IV—IV of FIG. 2 although, for convenience, indicating certain drive components as viewed from the left of FIG. 2.

Turning now to FIGS. 2, 3 and 4, the construction and operation of the second separating rotor 11 and associated separating grate 13 will now be described in greater detail. The rotor is of known axial flow type and comprises beaters 25 in the central region thereof with slightly different beaters 26 at either end. The rotor 11 receives crop material from the first separating rotor 9, the crop material being in a single mat. At the second separating rotor 11, the mat is split into two (by means not shown) and one mat is fed spirally around the rotor to one end thereof and the other spirally around the rotor to the other end thereof, i.e., one mat to each side of the machine. The separating concave or grate 13 essentially extends completely around the second separating rotor 11 except that an aperture 27 is provided in the central forward region in order to allow the incoming mat of crop material to enter the separating grate 13 and except for two apertures 28 at either end and at the rear of the separating grate 13 to allow the separate crop mats to be discharged. The separating grate 13 is, in fct, made up of four separate grate or concave portions 29,31,32,33, the construction of which may be of any known kind but the construction shown in the drawings being that of a plurality of transversely extending bars 34 spaced from each other and interconnected by wires or rods 35 extending at right angles to the bars and spaced apart transversely of the machine. The rotor 11 and separating grates 13 are essentially totally enclosed in a casing having a front wall 36, a rear wall 37 and a top wall 38, appropriate apertures being provided in the front and rear walls corresponding to the input and discharge apertures 27,28 of the overall grate. The discharge of the two mats of crop material from the rear of the machine through the apertures 28 in the rear wall of the casing is assisted by extensions of the grate rods 35 at the bottom of the apertures 28 (indicated at 39 in FIG. 4) and by a rearwardly and downwardly inclined plate or sheet 41 at the top of the apertures 28.

The separating rotor 11 is rotated at about 700 RPM and this results in the grain being separated from the crop material centrifugally so that separation is effected over all of the concave or grate 13 which, as already mentioned, extends essentially totally around the rotor. It is necessary, therefore, to remove the grain and any other crop material such as short pieces of straw which is separated through the upper portion of the grate or concave in order to prevent any build-up of crop material thereon which would impair the efficiency of the second separating rotor and might also result in uneven loading of the grain pan if the excessive build-up suddenly were removed. To this end, means, indicated generally at 42, are provided in accordance with the present invention for sweeping crop material away from the grate at the upper portion 29 thereof.

In the illustrated embodiment, the sweeper means 42 comprise six rotary members 43 to 48 three of which (43,44,45) are rotated in a direction such as to sweep grain rearwardly of the machine and three (46,47,48) arranged to sweep grain forwardly of the machine. As can best be seen in FIG. 2, the sweepers 43 to 48 extend the full width of the separating rotor 11 and are mounted on respective shafts 49 journalled in opposed sidewalls 51 (FIG. 2) of the machine. Each sweeper 43 to 48, while having a single shaft 49, is split into a right-hand portion and a left-hand portion which are spaced apart at the center of the machine. The right and left hand portions of the forwardmost sweeper 46 each comprise an auger having a flight 52 attached to the shaft 49 and extending generally from the center of the machine towards the outside thereof in a trough 53, the auger than being replaced generally midway of the respective portions by a pair of radially extending and diametrically opposed flexible blades 54 attached to respective rigid radial extensions of the shaft 49.

The rearwardmost sweeper 43 has a construction somewhat similar to the forwardmost sweeper 46 except that on each of the right- and left-hand portions the augers 52,53 and blades 54 are transposed so that the blades are towards the center of the machine and the augers are towards respective sides of the machine. All of the remaining four sweepers 44,45,47,48 comprise right- and left-hand blades 54 of a construction similar to that of the forwardmost and rearwardmost sweepers, without there being any auger portions so that the blades extend the full width of the rotor 11. The reason for the different construction of the forwardmost and rearwardmost sweepers 46,43 is that in the former case, it is imperative to move separated grain and other crop material transversely of the machine before allowing that crop material to fall vertically because if this were allowed to happen at the central portion of the machine, the falling crop material would be caught by the first separating rotor 9 and the grain damaged, if not lost, as a result.

At the rear of the second separating rotor 11, towards respective sides of the machine, the discharge outlets for the two mats of crop material are provided, as already explained, so that here, it is imperative that the crop material swept from the upper portion 29 of the grate or concave 13 is not allowed to fall onto either of the discharge mats as grain would again be lost. Accordingly, the crop material first has to be conveyed transversely inwardly of the machine by the augers 52,53 whereupon it can then be swept rearwardly by the sweeper blades 54 as will be described.

Considering now in greater detail the operation of the three forwardmost sweepers 46,47,48, they are rotated in a clockwise direction, as seen in FIGS. 3 and 4, so that crop material passing through the grate portion 29 in the vicinity of these sweepers is moved forwardly of the machine. The sweeper 48 located towards the center of the separating rotor, generally above the axis thereof, operates to sweep crop material towards the next (47) of the three forwardmost sweepers which in turn sweeps the crop material towards the forwardmost sweeper 46, the augers 52,53 of the latter operating to convey the crop material outwardly towards respective sides of the machine when it is then acted upon by the associated blades 54 which sweep the crop material from the respective augers and from the respective portions of the concave disposed below the blades. The crop material is swept against the front wall 36 of the casing from where it falls downwardly towards an auger 55 the axis of which is inclined rearwardly and downwardly of the machine.

It will be appreciated that two augers 55 are provided serving the respective right- and left-hand portions of the sweepers 40 to 48. The augers 55 also receive crop material separated through the outermost portions of grate or concave portions 31,32. The augers 55 operate to convey crop material collected therein upwardly and forwardly of the machine to the discharge end 56 at which a plurality of discharge vanes 57 are provided on the auger shaft which serve to discharge the crop material fed thereto through a discharge outlet 58 which is oriented such that the discharged crop material is spread transversely across the grain pan 14 which extends therebeneath. The augers 55 also serve to convey the rethreshed tailings from the tailings trough 19, the rethreshed tailings thus being spread over the grain pan 14, together with the crop material separated by the separating mechanism 11,13.

Looking now at the three rearwardmost sweepers 43,44,45, these are rotated in a direction opposite to that of the forwardmost sweepers 46,47,48 so as to sweep crop material rearwardly of the machine. Again, the sweeper 45 disposed generally centrally of the separating rotor 11 above the axis thereof operates to sweep crop material towards the next sweeper 44 which in turn sweeps crop material to the rearmost sweeper 43, the augers 52,53 of the latter conveying the crop material transversely of the machine towards the center thereof, the associated blades 54 then sweeping that crop material, together with that passing through the concave portion therebeneath, towards the rear of the machine against the rear wall 37 of the casing. The crop material falls down the rear wall 37 of the casing directly onto the grain pan 14 which extends beneath the separating rotor 11. Thus, the upper portion 29 of the concave or grate 13 is continuously swept by the sweeper means 43 to 48 so as to prevent any excessive build-up thereon of crop material which would impair the efficiency of the separating rotor.

It will be noted that the blades 54 of adjacent sweepers are oriented at right angles to each other so that the paths of the adjacent sweepers can overlap without the blades physically interferring with one another. The exceptions to this are the forwardmost and rearwardmost sweepers 46,43 which cannot overlap with the respective adjacent sweepers in view of the fact that the augers 52,53 are provided thereon which cannot be oriented so as to not to interfere with the adjacent sweeper blades. The sweepers 43 to 48 are arranged so that their paths come as close as possible to the upper grate portion 29 without the blades 54 or augers 52,53 actually touching the grate.

Since the three rearwardmost sweepers 43,44,45 operate to sweep crop material directly onto the grain pan 14, it is desirable for this crop material to be spread as evenly as possible over the grain pan as opposed to being deposited in "lumps" thereon. To this end, the auger 52,53 may be extended further towards the center of the machine and the auger troughs 53 apertured where they extend above the grain pan so that crop material can begin to be discharged therefrom to the grain pan 14 as well as being fed to the associated sweeper blades 54. Alternatively, or in addition, the sweeper blades 54 on the sweeper 43 may be arranged to cooperate with a wall member (not shown) having an inclined edge so that grain is also spread across the grain pan 14.

The drive for the sweepers is indicated at the left-hand side of FIG. 2 and, for convenience, the drive components have also been shown in FIG. 4 as if that figure were a view from the left-hand side of FIG. 2 even though the major portion of that figure is, in fact, a section on the line IV—IV of FIG. 2. An input drive sprocket 60 is provided which is driven from the drive source of the machine serving all the driven components and not shown in the drawings. A chain 59 engages the driven sprocket 60 and extends to an idler sprocket 61 and thence to a sprocket 62 located generally above and to one side of the sweeper 44. From this sprocket 62 the chain 59 is taken to a sprocket 63 attached to the shaft 49 of the rearwardmost sweeper 43 and then back to the drive sprocket 60. The sprockets 60,61 and 62 are driven in a clockwise direction, as seen in FIG. 4, and the sprocket 63 on the rearwardmost sweeper 43 is driven in an anti-clockwise direction.

A second sprocket 64 is provided on the shaft 49 of the rearwardmost sweeper 43 and a chain 65 connects this sprocket to respective sprockets 66,67 on the other two sweepers 44 and 45 of the three rearwardmost sweepers, thus driving these sweepers also in an anti-clockwise direction. A further sprocket 68 mounted on the same shaft as the sprocket 62 serves to drive a sprocket 69 mounted on the shaft 49 of the sweeper 48 via a chain 71. Another sprocket 72 attached to the shaft 49 of the sweeper 48 has a chain 75 which passes around similar sprockets 73,74 on the shafts 49 of the other two forwardmost sweepers 47,46 so that all three of the forwardmost sweepers are driven in a clockwise direction as seen in FIG. 4. The sweepers 43 to 48 are driven at between 300 to 400 RPM in timed relationship and extend over an arc of approximately 115° centered on the vertical plane containing the axis of the rotor 11.

With the arrangement of the illustrated embodiment it has been found that 5% of the grain separated by the second separating rotor 11 i separated through the upper grate portion 29 so that the provision of a grate 13 which extends essentially totally around the separating rotor and swept by the sweeper means is efficient and assists greatly in the final separation of grain which is extremely important in maximizing the harvested crop.

The flexible sweeper blades 54 may be replaced by rigid blades, care being taken to ensure that there is no physical contact between those blades and the upper grate portion 29. Furthermore, the six sweepers 43 to 48 of the illustrated embodiment may be reduced in number and it is possible for there to be one sweeper operating to sweep crop material forwardly of the machine, and a second sweeper operating to sweep crop material rearwardly of the machine. However, it is preferable to provide pairs of sweepers, desirably with their paths overlapping.

It will be understood that changes in the details, material, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly, as well as in the specific form shown.

Having thus described the invention, what is claimed is:

1. A combine harvester having threshing and separating means comprising a rotor, concave means extending at least partially around the rotor at a location above the axis of rotation of the rotor and sweeper means disposed in the vicinity of the concave means for sweeping crop material passing through the concave means away from said concave means to prevent an excessive build up of crop material on said concave means.

2. A combine harvester according to claim 1, wherein the concave means extend totally around the rotor, said sweeper means being associated with an upper portion of said concave means.

3. A combine harvester according to claim 1, wherein the sweeper means extend over an arc of approximately 115° centered on a vertical plane containing the rotor axis.

4. A combine harvester according to claim 2, wherein the sweeper means comprise a plurality of rotary sweepers having shafts to which are attached blades arranged to pass close to the concave means to sweep crop material therefrom.

5. A combine harvester according to claim 4, wherein each sweeper shaft is fitted with a pair of radially extending, diametrically opposed blades.

6. A combine harvester according to claim 5, wherein the sweeper means are arranged so that the paths of adjacent sweepers overlap, the blades of one sweeper being 90° out of phase with the adjacent sweeper to prevent physical interference therebetween.

7. A combine harvester according to claim 6, wherein each blade is formed from a flexible material.

8. A combine harvester according to claim 4, wherein a first set of said sweepers is arranged to sweep crop material in one direction away from the concave means, and a second set of said sweepers is arranged to sweep crop material in another direction away from the concave means.

9. A combine harvester according to claim 8, wherein said one direction and said other direction are to either side, respectively, of the rotor, whereby the shafts of the sweepers extend parallel to the rotor axis.

10. A combine harvester according to claim 4 wherein the rotor extends transversely of the machine, the concave means have an input aperture for crop material and at least one discharge aperture for crop material, and a forwardmost and a rearwardmost sweeper each have means for moving crop material generally axially of the rotor before the associated blades sweep that crop material away from the concave means, whereby crop material is prevented from being swept onto the incoming crop material and the discharged crop material.

11. A combine harvester according to claim 10, wherein means are provided for splitting the incoming crop material into two portions which are fed spirally around the rotor towards respective ends thereof, two discharge apertures being provided in the concave means, and each said sweeper being provided with two sets of blades serving to sweep respective portions of the concave to either side of the rotor centerline transverse to the rotor axis, with each of the forwardmost and rearwardmost sweeper means having said means for moving crop material generally axially of the rotor associated with each set of blades, said moving means of the forwardmost sweeper being operable to move crop material towards the associated side of the machine, and said moving means of the rearwardmost sweeper being operable to move crop material towards the center of the machine.

12. A combine harvester according to claim 11, wherein the rotor is housed within a casing having input and discharge apertures corresponding to those of the concave means and having in the bottom thereof at least one conveyor to which crop material swept forwardly of the machine falls and which conveys that crop material to a grain pan of the machine.

13. A combine harvester according to claim 12, wherein said at least one conveyor is in the form of at least one auger having at its discharge location means for discharging the crop material onto the grain pan so that it is spread over the latter.

14. A combine harvester accordig to claim 13, wherein the discharge means comprise one or more vanes attached to the associated auger shaft.

15. A combine harvester according to claim 14, wherein crop material swept by rearwardmost sweeper means falls directly to a grain pan of the machine.

16. A combine harvester according to claim 15, wherein spreading means are provided for spreading the crop material swept by the rearwardmost sweeper means generally transversely of the grain pan.

17. A combine harvester according to claim 16, wherein the spreading means comprise apertures in the trough associated with said rearwardmost sweeper means.

18. A combine harvester according to claim 17, wherein the rotor is rotatable at 700 RPM and the sweepers are rotatable at 300 to 400 RPM.

* * * * *